July 20, 1965   S. H. SIME   3,195,742
SILO UNLOADER

Original Filed Jan. 10, 1962   4 Sheets-Sheet 1

INVENTOR.
SYLVAN H. SIME
BY William A. Murray
ATTORNEY

July 20, 1965  S. H. SIME  3,195,742
SILO UNLOADER

Original Filed Jan. 10, 1962  4 Sheets-Sheet 2

*INVENTOR.*
SYLVAN H. SIME
BY William A. Murray
ATTORNEY

July 20, 1965     S. H. SIME     3,195,742

SILO UNLOADER

Original Filed Jan. 10, 1962     4 Sheets-Sheet 3

INVENTOR.
SYLVAN H. SIME

BY *William A. Murray*

ATTORNEY

July 20, 1965  S. H. SIME  3,195,742
SILO UNLOADER

Original Filed Jan. 10, 1962  4 Sheets-Sheet 4

*INVENTOR.*
SYLVAN H. SIME

BY *William A. Murray*

ATTORNEY

United States Patent Office 3,195,742
Patented July 20, 1965

3,195,742
SILO UNLOADER
Sylvan H. Sime, Kiester, Minn., assignor to Deere & Company, Moline, Ill., a corporation of Delaware
Original application Jan. 10, 1962, Ser. No. 165,394, now Patent No. 3,144,144, dated Aug. 11, 1964. Divided and this application Sept. 25, 1963, Ser. No. 311,465
20 Claims. (Cl. 214—17)

This application is a division of Serial No. 165,394, filed January 10, 1962, now Patent No. 3,144,144.

This invention relates to a material unloader for use in a silo. Still more particularly it relates to a type of silo or material unloader which moves on the surface of the silage and effects discharge of the upper layer of the silage through an opening in the silo wall.

In the use of surface silo unloaders, there are normally two problems of great magnitude which must be met in order for the unloader to be successfully operated, the first being to maintain a relatively smooth upper surface in the silage, and the second being the ability of the surface silo unloader to move the material into the center of the silo and from thence upwardly and outwardly through the wall opening of the silo.

It is therefore the primary object of the present invention to provide a new and novel manner of moving material inwardly to the center of the silo and then both upwardly and outwardly to the wall. It is also the object of the invention to provide a rather new and novel method of maintaining the sweeping mechanism of the silo unloader in a relation to the surface of the silage so that the silage will remain in substantially a level plane throughout operation of the silo unloader.

More specifically, it is the object of the present invention to provide a new and novel structure at the center of the silo which includes an inverted cup-like element with an impeller therein. Directly and closely adjacent the lower edge of the inverted cup is provided a radial sweep auger which extends from the center of the silo toward the wall of the silo and moves material inwardly to an area beneath the inverted cup or impeller blades. The sweep auger includes a flight element which is disposed normally outwardly of the inverted cup chamber and the flipper element which is fixed to the auger driveshaft and is normally disposed inwardly of the chamber wall. Consequently the material is moved inwardly through operation of the auger flight until it reaches the radial flipper on the auger driveshaft which will cause the material to be flipped upwardly into the path of the impeller blade. Fixed to the side of the cup chamber is an auger which receives the material from the impeller and feeds the material outwardly through the discharge opening in the silo wall.

In one form of the invention, it is proposed to provide the sweep auger structure with two distinct sections, one being a relatively short section which is disposed adjacent the wall and the other being a relatively long section which extends from an area spaced from the wall inwardly to the center of the silo. The outer auger section will normally move in advance of the inner section and will cut an annular trough in the surface of the silo. The inner auger section has a guide wheel on its outer end which will normally ride in the annular trough cut by the outer section and consequently the depth of cut of the inner section will be determined by the depth of the annular trough created by the outer auger section. In this form of the invention it is further proposed to provide the unique manner of controlling the depth of cut of the outer auger section so that the silage in the silo will have an upper surface which is generally both horizontal and level.

In a modified form of the invention it is specifically provided for a single sweep auger to extend substantially the radius of the silo and a unique manner of maintaining the surface of the silage level as well as maintaining the surface substantially horizontal.

Other objects and advantages of the invention will become apparent to those skilled in the art as the nature of the invention is better understood from the following description and as shown in the accompanying drawings.

Figures 1, 2:
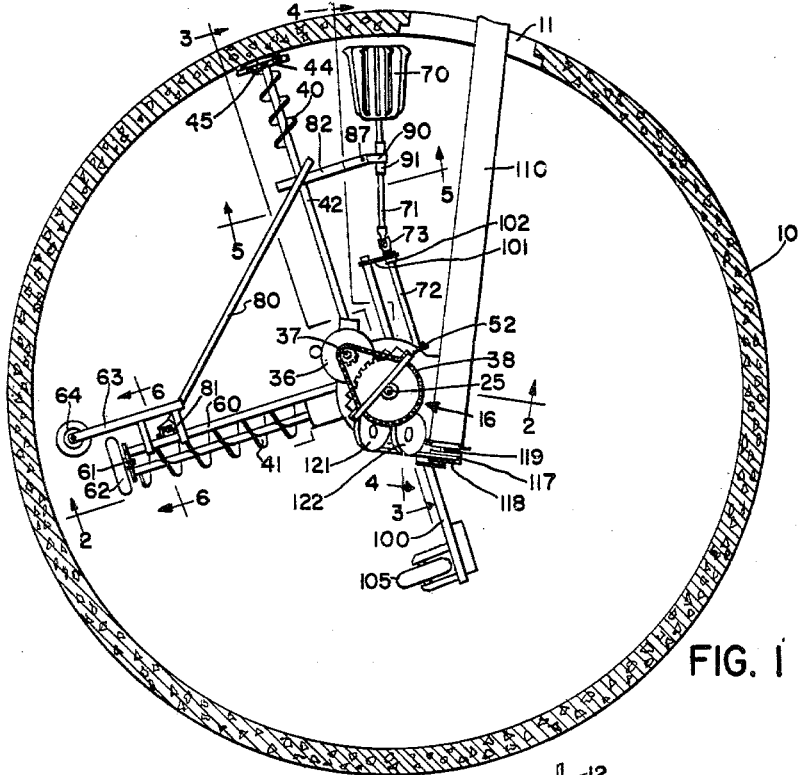
FIG. 1 is a plan view of a silo with the silo unloader positioned therein.
FIG. 2 is a sectional view taken substantially along the line 2—2 of FIG. 1.
Figure 3:
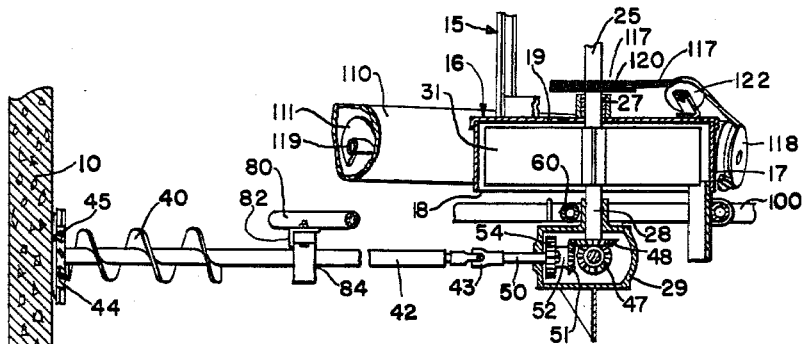
FIG. 3 is a sectional view taken substantially along the line 3—3 of FIG. 1.
Figure 4:
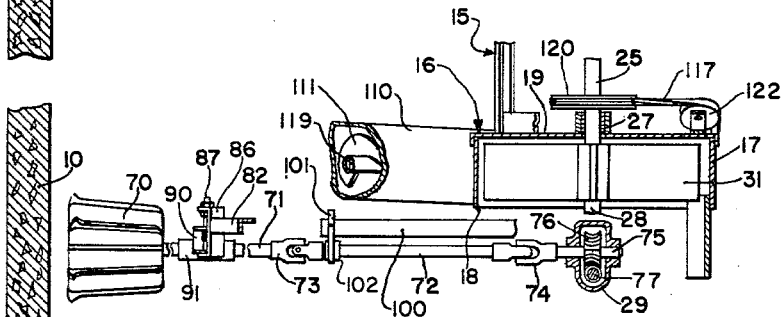
FIG. 4 is a sectional view taken substantially along the line 4—4 of FIG. 1.
Figure 5:
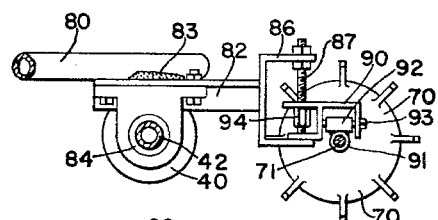
FIG. 5 is a sectional view taken substantially along the line 5—5 of FIG. 1.
Figure 6:
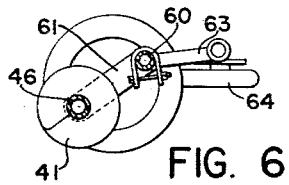
FIG. 6 is a sectional view taken substantially along the line 6—6 of FIG. 1.

Referring now to the drawings, the silo unloader will normally be disposed in a conventional silo having an upright cylindrical wall 10 with a series of vertically aligned side openings or material outlets 11 conventionally closed by doors, not shown, which may be removed for purposes of discharging silage from the silo. The silo unloader is normally supported in the silo in pendulum fashion by a cable 12 depending from a supporting structure on the top of the silo. As is conventional, the cable may be retracted or extended by a winch, not shown, for purposes of raising and lowering the silo unloader.

The silo unloader is composed of a centrally located main framework structure 15 which includes an inverted cup-shaped impeller chamber or casing 16 having a vertically disposed cylindrical casing wall 17 with a lower circular edge 18 having the same diameter as the chamber walls 17. The casing 16 is closed at its upper surface by a horizontally disposed panel wall 19. The casing 16 has therein and on one side thereof a material discharge opening at 20.

The main framework 15 carries thereon a vertically disposed driveshaft 25 by means of upper and lower journals 26, 27 positioned above the casing 16, the lower journal 27 being disposed directly on the surface of the top panel 19. The shaft 25 extends through the top wall 19 and has a lower end 28 disposed beneath the chamber 16 and extending into a gear casing 29. Fixed to the shaft 25 internally of the casing 16 and by means of a set screw 30, are impeller blades 31. The impeller blades 31 extend laterally relative to the shaft 25 and have upper edges lying closely adjacent the top wall 19 and outer edges lying closely adjacent the cylindrical wall 17. The lower edges of the impeller blades 31 are substantially at the level of the lower edge 18 of the cylindrical wall 17. Consequently the impeller blades 31 will move within the chamber 16 so as to clear the entire chamber of material.

The main framework 15 also has the motor supporting structure 35 as a part thereof supoprting an electric motor 36 having a vertical shaft 37. The shaft 37 is drivingly connected to the vertical shaft 25 by means of a chain drive indicated in its entirety by the reference numeral 38.

A sweep mechanism, including a first or outer auger 40 and a second or inner auger 41, is disposed on the surface of the silage. The auger 40 has an auger driveshaft 42 articulately connected by a universal type joint 43 to the central portion of the silo unloader. In viewing FIG. 1, it becomes apparent that the auger flight 40 is disposed cosely proximate the wall 10 and operates to feed material centrally. The outer end of the shaft 42 rigidly carries a cutter 44 with a convex face plate 45 which rotates freely on the shaft 42. The cutter cuts frozen or other type of silage from the wall 10 of the silo. In operation, the auger 40 will sweep about the surface of the silage and cut an annular trough adjacent the wall 10.

The auger 41 is supported by an auger driveshaft 46, the inner end of which is drivingly connected to the lower end 28 of the driveshaft 25 by means of bevel gears 47, 48. The bevel gears 47, 48 are disposed in an extension of the gear transmission housing 29. The articulate or universal joint 43 is driven by a short stub shaft 50 extending into the gear housing 29. The shaft 50 is drivingly connected to the lower end 28 of the main shaft 25 by means of a bevel gear 51 and a countershaft 52 carrying a pinion 53 of a reversing gear drive. The pinion 53 meshes with a gear 54 carried on the shaft 50. The main framework 15 further includes a laterally disposed arm 60 which extends outwardly toward the wall 10 and slightly above the auger 41. The outer end of the arm 60 and the auger shaft 46 are interconnected by a bracket 61 which in turn supports gage wheel 62. Also carried on the outer end of the arm 60 is bracket structure 63 carrying a laterally disposed guide wheel 64, the latter moving about a vertical axis.

Reviewing the sweep auger arrangement in its entirety, it becomes apaprent that the auger 40 is disposed adjacent the wall 10 and operates to sweep an annular path adjacent the wall 10 and to move silage inwardly. The gage wheel 62 will normally ride in this annular trough formed by the auger 40 and consequently will cause the auger 41 to convey material inwardly toward the center of the silo. It therefore becomes apaprent that the depth of cut of the auger 40 determines the overall depth of cut of the silage since the depth of cut of auger 41 is dependent upon the depth that the gage wheel 62 rides on the silage. The wheel 64 is normally out of engagement of the wall 10. However, should abnormal conditions exist in one side of the silage or should for some reasons the pendulum or cable 12 cause the silo unloader to swing, the wheel 64 will engage the wheel for the purpose of buffering the auger 41 and its gage wheel 62 against contact with the wall. Consequently the wheel 64 normally serves the purpose of limiting movement of the silo unloader in respect to the wall of the silo.

The entire silo unloader is angularly driven about the silo by means of drive wheel means including a conventional type drive wheel 70, which has an inwardly directed drive wheel shaft 71, the inner end of which is connected to a propeller shaft 72 by means of a universal or articulate joint 73. The inner end of the propellent shaft 72 is drivingly associated with the lower end 28 of the vertical driveshaft 25 by means of a universal or articulate joint 74 which connects the inner end of the shaft 72 to the outer end of the intermediate driveshaft 75 which extends into the gear housing 29. The shaft 75 has a gear 76 mounted thereon which is driven by a worm gear 77 carried on an outer extension of the auger driveshaft 46. The worm 77 of course operates as a speed reducer and consequently the drive wheel 70 will normally move at a relatively low speed over the surface of the silage. Also, the drive wheel 70 will normally move in the path of the annular trough formed by the auger 40.

The drive wheel 70, auger 40, and auger 41 are all interconnected by means of laterally disposed structure composed of a diagonal laterally disposed structural tube 80 pivoted at 81 about a horizontal axis parallel to the arm 60 and extending to a point closely adjacent the inner end of auger 40. An arm structure 82 is welded at 83 to the opposite end of the structural tube 80 and carries a bearing 84 for supporting the auger shaft 42. The opposite end of the arm structure 82 rigidly carries a U-shaped bracket 86. The bracket 86 carries between the legs of the U an upright threaded adjusting stud 87. A supporting bracket 90 projects outwardly from the threaded stud 87 and carries a journal or bearing 91 in which the shaft 71 is journalled. The bearing 91 is permitted movement up and down by means of a supporting tube 92 fixed to the bearing 91 and carried on a horizontal pivot stud 93. The bearing supported bracket 90 has upper and lower flanges which are suitable to pass relatively freely on the threaded stud 87. A nut element 94 welded to bracket 90 receives the stud 87 and operates through turning the stud 87 to adjust vertically the entire bearing supporting bracket 90. Viewing the entire structure as a whole, it becomes apparent that the members 80, 82 and 90 are all rigidly joined together and that raising and lowering of one of the members will raise and lower the other of the members.

A laterally disposed tubular member 100 extends diametrically across the upper surface of the silage and has one end connected to the outer end of the propellant shaft 72, the latter being connected to the tubular member 100 by means of a bracket 101. A suitable journal 102 is provided to permit the shaft 72 to rotate relative to the bracket 101. The opposite end of the tube member 100 carries surface sensing wheel 105 which normally rides on the surface of the silage. The tube member 100 is rigid with and is a portion of the main framework 15. Reviewing the entire structure as a whole, it will become apparent that the wheel 105 in combination with the drive wheel and auger 40 operates as a levelling mechanism. By way of explanation, the wheel 105 will ride over high or level spots causing the tubular member 100 to raise or lower. For example, should the wheel 105 pass over a high level of silage, the tubular member at the end of the wheel 105 will rise and the opposite end will be caused to lower. This will cause the shaft 71 also to be lowered since in effect a member 101 will cause the universal joint 73 to be lowered. As the shaft 71 is lowered it will cause the rigid structures 80, 82 and 90 to also be lowered and since the latter is connected to the auger shaft 42, it will cause the auger 40 to dig a deeper bite in the silage. Consequently, should at any time there be a tendency for the silage level to form a cone shape, i.e., either to have the outer edge of the silage higher than the center or the center silage at a higher level than the outer edge, the wheel 105 will sense the uneven condition and will cause the auger 40 to dig deeper or shallower depending upon which it is desired to bring the level of the silage substantially to a horizontal plane.

Also, it should be recognized that as the auger 40 makes a deeper trough, the gage wheel 62 will cause the auger 41 to also cut deeper in the silage. Consequently the entire level of the silage is gaged by the sensing wheel 105.

Adjacent to the chamber 16 and opening into the side discharge opening 20 is an auger housing 110 which extends from the chamber 16 outwardly and through one of the openings 11 in the silo wall 10. The auger housing is unique in its shape in that the width of the housing is considerably wider than the auger 111 normally mounted therein. The auger housing 110 has its intake opening adjacent the side opening 20 of the chamber 19. Reviewing FIG. 2, it becomes apparent that the auger 111 lies closely adjacent one of the walls of the housing 110 but is spaced laterally from the opposite upright wall. The purpose of so spacing the auger 111 is to permit silage or other materials to move from the auger between the wall 110 and the outer edge of the auger 111. The silage caught between the wall and silage will be pushed along by the auger 111 even though it will not be augered. This effect is created since there will normally be a frictional type engagement between the material being augered by the auger 111 and the material lying alongside the auger 111. Consequently by so disposing the auger in relation to the auger housing 110, the overall capacity of the discharge auger is considerably increased.

Adjacent the inner end of the auger 41 is a flipper or paddle 114 normally disposed beneath the under side of the impeller chamber 16. An auger section 115 is also mounted on the shaft 46 and is of a reversed pitch than the auger 41. Consequently the material being moved inwardly by the auger 41 will contact the flipper or paddle 114 and will be driven upwardly. Material will be prevented from moving further inward of the paddle 114 by the auger flight section 115. It will be noted, in viewing FIG. 2, that the outer edge of the flipper paddle 114 will come closely adjacent the lower edge of the chamber 118 when it is in its extreme upper position. Consequently the material being thrown or lifted upwardly will pass directly into the path of the impeller blades 31 to be moved internally of the chamber 119 until passing through the opening 20 and into the auger housing 110. Suitable shielding such as 116 is provided adjacent the flipper paddle 114 so as to limit the quantity of material which may move outwardly from beneath the chamber 16.

The auger 111 is driven by means of a V-belt 117 extending over a pulley 118 at the end of an auger drive shaft 119 on which is carried the auger flighting 111. The belt 117 extends over a drive pulley 120 carried on the upper end of the main drive shaft 25. A pair of idler pulleys 121, 122, accommodating the extension of the belt 117 around the corner of the chamber 116, is fixed to the upper surface of the chamber 16. In this form of the invention, therefore, it becomes apparent that the entire silo unloader is driven from the single motor 36 and directly from the vertical driveshaft 25. This, therefore, provides a relatively cheap and simple type of drive.

In the modification of the invention shown in FIGS. 7–17, the central impeller portion and auger discharge are substantially identical to that of the previous form, the main distinction being that a separate electric motor 125 is carried on the top of the auger housing 110 and is drivingly connected to the auger shaft 119 by means of a chain and sprocket drive 126. Consequently the entire belt drive extending from the main shaft 25 to the auger driveshaft 119 of the previous form of the invention is eliminated. Since the main details of the central impeller section and its respective drive mechanism is identical similar reference numerals are used and further description is not deemed necessary and will not be repeated.

The supporting structure interconnecting the drive wheel with the sweep mechanism is composed of a triangularly shaped laterally disposed frame structure consisting of three rigidly interconnected tubes or pipe sections 130, 131, and 132. The tubular member 130 extends outwardly from the central portion of the silo to a point adjacent an outer drive wheel 138 and is relatively small so as to permit a degree of flexing in the tube 130. The member 130 is rigidly connected to the tubular member 132 by means of an angle iron steel element 133 which underlies adjacent ends of the tubular members 130, 132 and is welded as at 134 to the under side of tubular member 132. The tubular member 130 is rigidly held to one flange of the angle iron steel strap 133 by means of a bolt 135 extending through a rigid vertical bracket 136 on the end of the tubular member 130. There are a series of vertically spaced openings 137 in the bracket 136 so that the member 130 may be adjusted vertically relative to the other portions of the frame. The extreme outer end of the tubular member 132 has fixed thereto a U-shaped bracket structure 140 which carries an upright threaded stud 141 between the legs of the bracket 140. Mounted on the threaded stud 141 is a driveshaft supporting bracket 142 extending outwardly and carrying a bearing 143 on which is mounted a wheel driveshaft 144. The bracket structure 142 has suitable apertures therein to receive the threaded stud 141 and the bracket structure 142 may be adjusted vertically by adjusting a nut 145 on the stud 141. The bearing 143 is carried on the bracket structure 142 by means of a horizontal tube 146 adapted to pivot about the horizontal axis of a pivot bolt 147. Consequently the wheel may be adjusted relative to the supporting structure 130, 131, 132.

The tubular member 131 extends radially outwardly from the center of the silo and supports at its outer end an auger driveshaft 150, the specific type of support being a bracket 151 carrying a shaft bearing 152. The tubular member 131 is generally to one side and above the auger shaft 150. The auger shaft 150 carries an auger flighting 154 extending substantially radially of the silo. It terminates adjacent the bearing 152 at its outer end and terminates at its inner end substantially directly beneath the vertical wall 17 of the impeller chamber 16. Directly beneath the impeller chamber 16 is a radially extending flipper blade 155 which operates to receive the material from the sweep auger 154 and to flip or impel it upwardly in the path of the impeller blades 31. The outer end of the auger shaft 150 carries a wall chipper wheel 156 disposed closely proximate the wall and outward of the shaft bearing 152. The chipper wheel 156 operates to chip the silage, which might be frozen or otherwise clinging to the wall. The tubular member 131 carries also an outwardly projecting bracket structure 160 supporting a wall guide wheel 161 which engages the wall above the chipper wheel 156 and operates to prevent direct contact with the wall by the blades on the chipper wheel 156.

The inner end of the auger driveshaft 150 is drivingly connected to the main driveshaft 25 by means of bevel gears 163, 164 respectively disposed in a gear housing 165. The shaft 150 extends beyond the gear 163 and has mounted on the end thereof a worm gear 166 which meshes with the gear 167 carried on a short stub shaft 168. The shaft 168 extends outwardly of the gear housing and is connected to the inner end of the drive wheel shaft 144 by means of an articulate connection 169.

Figure 7:
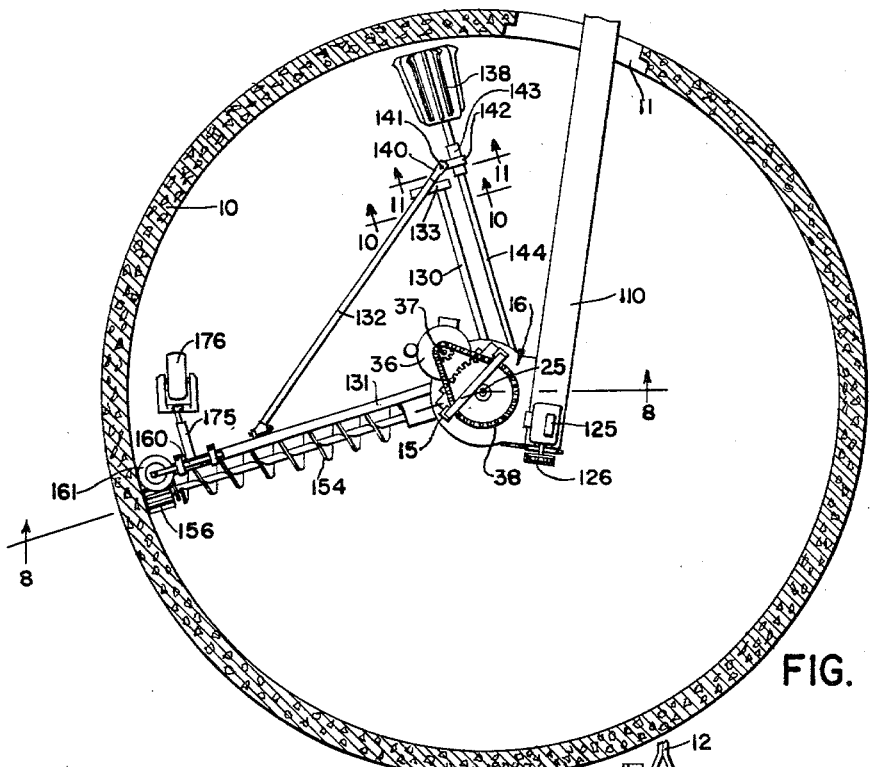
FIG. 7 is a plan view of a silo and a modified form of the silo unloader.
Figure 8:
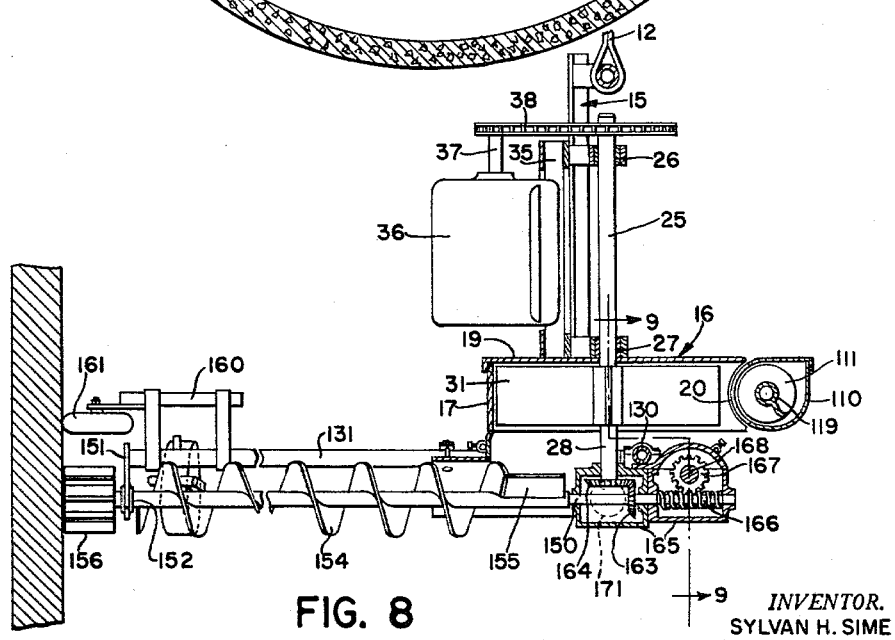
FIG. 8 is a sectional view taken substantially along the line 8—8 of FIG. 7.
Figure 9:
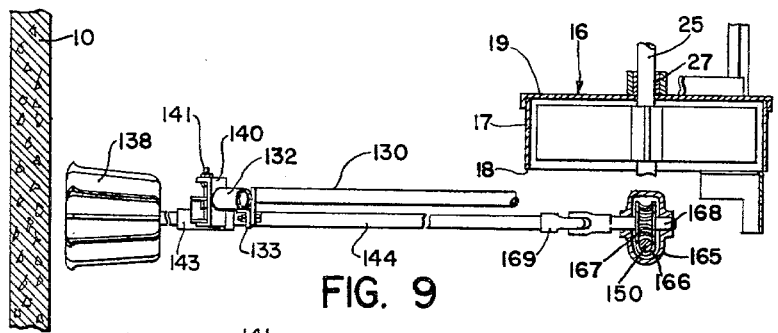
FIG. 9 is a sectional view taken substantially along the line 9—9 of FIG. 8.
Figures 10, 11, 12:
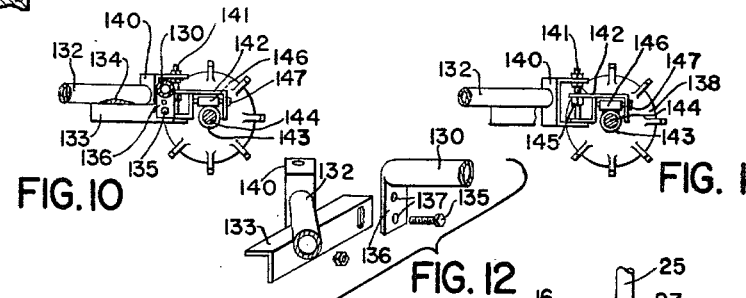
FIG. 10 is a sectional view taken substantially along the line 10—10 of FIG. 7.
FIG. 11 is a sectional view taken substantially along the line 11—11 of FIG. 7.
FIG. 12 is an exploded view of portions of the structure shown in FIG. 11.
Figure 13:
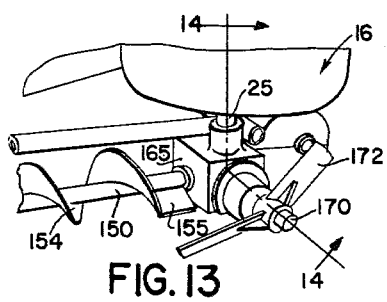
FIG. 13 is a perspective view showing a portion of the central section of the silo unloader.
Figure 14:
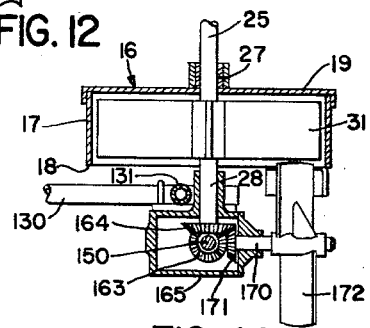
FIG. 14 is a vertical sectional view taken substantially along the line 14—14 of FIG. 13.
Figure 15:
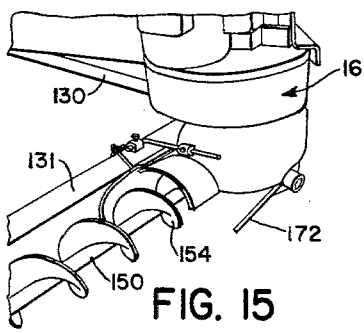
FIG. 15 is a perspective view showing a different portion of the central portion of the silo unloader.
Figure 16:
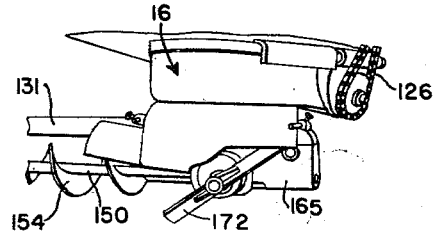
FIG. 16 is still a further perspective view showing a different portion of the central portion of the silo unloader.

Also drivingly connected to the main shaft 25 disposed at right angles to the auger shaft 150 is a second flipper driveshaft 170. A bevel gear 171 is provided on the shaft 170 internally of the gear housing 165 and is drivingly connected to the bevel gear 164 carried on the main driveshaft 25. The outer end of the shaft 170 terminates beneath the impeller chamber 161 and carries at its outer end an impeller or second flipper blade 172. The first paddle or flipper 155 and the flipper blade 172 will normally operate so that the adjacent sides thereof move upwardly. Consequently, material moving inwardly by the auger 154 will pass between the blades 155 and 172 which will cooperate to drive the material upwardly into the chamber 16 where it will contact the impeller blades 31 in the manner previously described. In viewing the silo unloader as shown in FIG. 7, the silo will normally move in a counterclockwise direction with the wheel 138 trailing relative to the sweep auger 154. It will also be noted that the auger 154 is substantially at right angles to the driveshaft 144. As will later become apparent, it is believed that this is probably the best angle use, although the levelling system presently to be described could operate from a practical standpoint at other angles. Preferably the auger 154 should be no more than 90° in advance or in a trailing direction to the drive wheel 138.

Fixed to the outer end of the tubular framework 131 is a rigid wheel frame 175 extending in a trailing direction relative to the number 131. The frame 175 carries the sensing or leveling wheel 176 which normally rides over the surface of the silage. The sensing wheel 176 will operate in conjunction with the wheel 138 and the auger 154 to maintain the surface substantially level. For example, with the surface of the silage level and the center of the unloader slightly raised, the unloader could run but no silage would be moved. By lowering the cable in the center the auger 154 would be lowered a like amount in the center but because of being supported by the gage wheel and balanced by the traction wheel through the tubular steel member 130, the auger would be lowered a lesser amount on the outside so the machine would cut and remove silage until the outside is at the same level as the inside. At that point the machine is again supported by the cable and the gage wheel and no more silage could be removed without further lowering the support cable. The previous explained action keeps the top of the silage in a level plane but not necessarily a horizontal plane. The maintaining of the surface of the silage in a horizontal plane is achieved by a combination of the above action plus the flexing of the tubular pipe 130. This flexing is caused by the fact that the main weight of the machine is supported by the cable and because of the pendulum action, the main frame as well as the sweep, tries to maintain the level substantially horizontal, the latter being permitted by the flexing of the pipe 130. As a further example, if in FIG. 7 the traction wheel were in a low spot and the silage adjacent the silo door at a relatively high level, the upward flexing of the pipe 130 caused by the pendulum action of the main weight would allow the sweep auger to remain nearly level, and being supported at the outside end by the gage wheel, the sweep auger would have a tendency to take a heavier than normal cut to reduce the height of the high spot. Likewise when the traction wheel was on the high spot the pipe 130 would flex downwardly due to the pendulum action of the weight of the machine keeping the sweep nearly level and riding on the gage wheel so as to take a lesser cut, further reducing the amount of difference in the high and low levels in silage. From a theoretical standpoint, the closer the wheel 176 is to the drive wheel 138 and the auger 154 is to the wheel 138, the more effective will the levelling mechanism of the present invention operate. From a practical standpoint, it has been found that due to balance of the entire silo unloader it is better to have the auger 154 approximately 90° away from the drive wheel 138.

The modified form of the invention will operate in a somewhat similar manner of the previous form other than the levelling mechanism which has been set forth in detail. The auger 154 will move the silage inwardly whereupon the flippers 155, 172 will then move the material upwardly into the path of the impeller blade 31. The impeller blade will drive the material through the opening in the chamber wall 16 and into the auger housing 110 which in turn will move the material outward of the silo.

While only one form of the invention has been shown, it should be recognized that other forms and variations will occur to those skilled in the art. Therefore, it should be understood that while the present disclosure was shown and described in detail for purposes of completely and fully explaining the principles of the invention, it was not the intention to so limit or narrow the invention beyond the broad concepts set forth in the appended claims.

I claim:

1. A material unloader for use in a silo having an upright silo wall with a material outlet in one side thereof comprising: a main frame structure including an inverted cup-shaped impeller chamber having an upright annular wall with a lower terminal edge and a side discharge opening in the wall; means supporting the frame structure adjacent the center of the silo; a vertical drive shaft extending through and concentric with the axis of the chamber with a lower end below the chamber; an impeller including at least one laterally extending and vertically disposed impeller blade fixed to the shaft with an outer upright edge closely adjacent the chamber wall and a lower edge substantially coplanar with the lower edge of the wall; sweep means disposed radially in the silo beneath the chamber and extending substantially from the center to the wall of the silo and including a pair of laterally extending and angularly spaced auger drive shafts, a first auger flighting on one of the shafts having an outer end closely proximate the silo wall and an inner end spaced from the chamber effective to sweep an annular trough adjacent the silo wall; a second auger flighting on the other auger shaft extending between the annular trough and the chamber wall; a flipper fixed to and extending radially from one of the auger shafts beneath and inboard of the chamber and adapted to flip material upwardly in the path of the impeller blade; a discharge housing having one end connected to the chamber adjacent to and for receiving material through the side discharge, and extending therefrom to the outlet in the silo wall, a conveyor within the housing for discharging material through the wall opening; and a drive mechanism for effecting rotation of the sweep means over the surface of the material in the silo.

2. A material unloader for use in a silo having an upright silo wall with a material outlet in one side thereof comprising: a main frame structure including an inverted cup-shaped impeller chamber having an upright annular wall with a lower terminal edge and a side discharge opening in the wall; means supporting the frame structure adjacent the center of the silo; a vertical drive shaft extending through and concentric with the axis of the chamber with a lower end below the chamber; an impeller including at least one laterally extending and vertically disposed impeller blade fixed to the shaft with an outer upright edge closely adjacent the chamber wall and a lower edge substantially coplanar with the lower edge of the wall; sweep means disposed radially in the silo beneath the chamber and extending substantially from the center to the wall of the silo and including a pair of laterally extending and angularly spaced auger drive shafts, a first auger flighting on one of the shaft having an outer end closely proximate the silo wall and an inner end spaced from the chamber effective to sweep an annular trough adjacent the silo wall; a second auger flighting on the other auger shaft extending between the annular trough and the chamber wall; a flipper fixed to and extending radially from one of the auger shafts beneath and inboard of the chamber and adapted to flip material upwardly in the path of the impeller blade; a material conveyor having one end supported on the frame structure adjacent to and for receiving material through the side discharge, and extending therefrom to the outlet in the silo wall.

3. A material unloader for use in a silo having an upright silo wall with a material outlet in one side thereof comprising: a main frame structure including an inverted cup-shaped impeller chamber having an upright annular wall with a lower terminal edge and a side discharge opening in the wall; means supporting the frame structure adjacent the center of the silo; a vertical drive shaft extending through and concentric with the axis of the chamber with a lower end below the chamber; an impeller including at least one laterally extending and vertically disposed impeller blade fixed to the shaft with an outer upright edge closely adjacent the chamber wall and a lower edge substantially coplanar with the lower edge of the wall; sweep means disposed radially in the silo beneath the chamber and extending substantially from the center to the wall of the silo and including a pair of laterally extending and angularly spaced auger drive shafts, a first auger flighting on one of the shafts having an outer end closely proximate the silo wall and an inner end spaced from the chamber effective to sweep an annular trough adjacent the silo wall; a second auger flighting on the other auger shaft extending between the annular trough and the chamber wall; a flipper fixed to and extending radially from one of the auger shafts beneath and inboard of the chamber and adapted to flip material upwardly in the path of the impeller blade; a wall chipping element operatively connected to said one auger shaft and disposed between the outer end of the first auger flighting and side wall; a material conveyor having one end supported on the frame structure adjacent to and for receiving material through the side discharge, and extending therefrom to the outlet in the silo wall.

4. A material unloader for use in a silo having an upright silo wall with a material outlet in one side thereof comprising: a main frame structure including an inverted cup-shaped impeller chamber having an upright annular wall with a lower terminal edge and a side discharge opening in the wall; means supporting the frame structure adjacent the center of the silo; a vertical drive shaft extending through and concentric with the axis of the chamber with a lower end below the chamber; an impeller including at least one laterally extending and vertically disposed impeller blade fixed to the shaft with an outer upright edge closely adjacent the chamber wall and a lower edge substantially coplanar with the lower edge of the wall; sweep means disposed radially in the silo beneath the chamber and extending substantially from the center to the wall of the silo and including a pair of laterally extending and angularly spaced auger drive shafts, a first auger flighting on one of the shafts having an outer end closely proximate to the silo wall and an inner end spaced from the chamber effective to sweep an annular trough adjacent the silo wall; a second auger flighting on the outer auger shaft extending between the annular trough and the chamber wall; a gage wheel supporting the outer end of the second auger flighting and extending radially outwardly and beyond the outer end thereof and disposed to ride in the annular trough of the first auger flighting; a flipper fixed to and extending radially from one of the auger shafts beneath and inboard of the chamber and adapted to flip material upwardly in the path of the impeller blade; a material conveyor having one end supported on the frame structure adjacent to and for receiving material through the side discharge, and extending therefrom to the outlet in the silo wall.

5. A material unloader for use in a silo having an upright silo wall with a material outlet in one side thereof comprising: a rigid laterally disposed framework; centrally located drive means supported on the framework; a propellent shaft having an inner end articulately connected to the drive means and extending to an outer end spaced from the central portion of the silo; drive wheel means outwardly of the propellent shaft including a wheel drive shaft; an articulate coupling connecting the drive shaft to the outer end of the propellent shaft; a first journal on the framework supporting the propellent shaft; a level indicating wheel on the framework effective to raise and lower the journal and said coupling in response to the wheel passing over low and high levels respectively of material in the silo; a sweep mechanism disposed in advance of the drive wheel effective to move material inwardly; rigid structure pivotally mounting the sweep mechanism on the framework for up and down movement; a second journal supported on the latter structure and carrying the wheel drive shaft and effective to raise and lower said sweep mechanism in response to raising and lowering of the coupling; a centrally located impeller mechanism effective to receive material from the sweep mechanism; and a discharge conveyor extending from the central impeller mechanism to the material outlet for discharging material received from the impeller mechanism.

6. A material unloaded for use in a silo having an upright silo wall with a material outlet in one side thereof comprising: a rigid laterally disposed framework; centrally located drive means supported on the framework; a propellent shaft having an inner end articulately connected to the drive means and extending to an outer end spaced from the central portion of the silo; drive wheel means outwardly of the propellent shaft including a wheel drive shaft; an articulate coupling connecting the drive shaft to the outer end of the propellent shaft; a first journal on the framework supporting the propellent shaft; a level indicating wheel on the framework effective to raise and lower the journal and said coupling in response to the wheel passing over low and high levels of material in the silo; a sweep mechanism disposed in advance of the drive wheel effective to move material inwardly; rigid structure pivotally mounting the sweep mechanism on the framework for up and down movement; a second journal supported on the latter structure and carrying the wheel drive shaft and effective to raise and lower said sweep mechanism in response to raising and lowering of the coupling; a centrally located discharge mechanism effective to receive material from the sweep mechanism and discharge the material through the outlet.

7. A material unloader for use in a silo having an upright silo wall with a material outlet in one side thereof comprising: a rigid laterally disposed framework; centrally located drive means supported on the framework; a propellent shaft having an inner end articulately connected to the drive means and extending to an outer end spaced from the central portion of the silo; drive wheel means outwardly of the propellent shaft including a wheel drive shaft; an articulate coupling connecting the drive shaft to the outer end of the propellent shaft; a first journal on the frame supporting the propellent shaft; a level indicating wheel on the framework effective to raise and lower the journal and said coupling in response to the wheel passing over low and high levels of material in the silo; a sweep mechanism disposed in advance of the drive wheel effective to move material inwardly; rigid structure pivotally mounting the sweep mechanism on the framework for up and down movement; and a second journal supported on the latter structure and carrying the wheel drive shaft and effective to raise and lower said sweep mechanism in response to raising and lowering of the coupling.

8. The invention defined in claim 7 in which the sweep mechanism includes an auger positioned in advance of the wheel means and the rigid structure includes an auger shaft substantially parallel to the propellent and drive shafts whereby the raising and lowering of the second journal will raise and lower the auger shaft.

9. The invention defined in claim 8 in which the wheel means includes a traction wheel adjacent the silo wall and the auger is disposed adjacent the wall whereby the wheel will move in the trough in the material left by the auger.

10. The invention defined in claim 7 in which the level indicating wheel is supported on the framework spacedly from the center of the silo and on the opposite side thereof than the drive wheel.

11. A material unloader for use in a silo having an upright silo wall with a material outlet in one side thereof comprising: a rigid laterally disposed framework; suspension means supporting the framework closely above the surface of the material; drive means supported on the framework adjacent the center of the silo; a propellent shaft having an inner end articulately connected to the drive means and extending to an outer end spaced from the central portion of the silo; drive wheel means outwardly of the drive shaft including a wheel drive shaft and effective to move the framework angularly; an articulate coupling connecting the drive shaft to the outer end of the propellent shaft; a first journal on the frame supporting the propellent shaft; a level indicating wheel on the framework effective to raise and lower the journal and said coupling in response to the wheel passing over low and high levels on the surface of the material; a first auger in advance of the wheel means and effective to cut an annular trough in the material and in the path of travel of the wheel means; a sweep auger supported on the framework extending on a radius from the center of the silo; a gage wheel on the sweep auger adapted to ride in the trough formed by the first auger; an auger shaft for said first auger pivotally mounting the first auger on the framework for up and down movement; a second journal rigid with the auger shaft carrying the wheel drive shaft and effective to raise and lower said first auger in response to raising and lowering of the coupling; and a centrally located mechanism effective to receive material from the sweep auger and discharge the material through the material outlet.

12. A material unloader for use in a silo having an upright silo wall with a material outlet in one side thereof comprising: a rigid laterally disposed framework; suspension means supporting the framework closely above the surface of the material; drive means supported on the framework adjacent the center of the silo; a level indicating wheel on the framework effective to raise and lower the framework in response to the wheel passing over low and high levels on the surface of the material; a first auger effective to cut an annular trough in the material; a sweep auger supported on the framework extending on a radius from the center of the silo; a gage wheel on the sweep auger adapted to ride in the trough formed by the first auger; an auger shaft for said first auger pivotally mounting the first auger on the framework for up and down movement; a connection between the framework and said auger shaft effective to raise and lower said first auger in response to raising and lowering of the framework; and a centrally located mechanism effective to receive material from the sweep auger and discharge the material through the material outlet.

13. A material unloader for use in a silo having an upright silo wall with a material outlet in one side thereof comprising: a rigid laterally disposed framework extending from a central portion in the silo to points adjacent the wall; drive means on the central portion of the framework; a traction wheel drive shaft having an inner end articulately connected to the drive means and extending to the outer end spaced from the central portion of the silo; a drive wheel on the outer end of the wheel drive shaft effective to move the framework angularly around the silo; a rigid laterally disposed structure pivotally mounted on the framework for up and down movement and extending toward the traction wheel; a journal on the structure engaging the shaft and effective to raise and lower the structure in accordance with the material level the traction wheel is passing over; a sweep mechanism mounted on the framework in advance of the drive wheel effective to move material centrally; a level wheel supported on the framework between the sweep mechanism and traction wheel and engaging the surface of the material at a point offset from the pivotal connection between the structure and framework whereby raising and lowering of the structure will effect raising and lowering of the sweep mechanism; and a centrally located mechanism supported on the framework effective to receive material from the sweep mechanism and discharge it through the material outlet.

14. A material unloader for use in a silo having an upright silo wall with a material outlet in one side thereof comprising: a rigid laterally disposed framework extending from a central portion in the silo to points adjacent the wall; drive means on the central portion of the framework; a traction wheel drive shaft having an inner end articulately connected to the drive means and extending to an outer end spaced from the central portion of the silo; a drive wheel on the outer end of the wheel drive shaft effective to move the framework angularly around the silo; a rigid laterally disposed structure pivotally mounted on the framework for up and down movement and extending toward the traction wheel; a journal on the structure engaging the shaft and effective to raise and lower the structure in accordance with the material level the traction wheel is passing over; a sweep mechanism mounted on the framework substantially at 90° in advance of the drive wheel effective to move material centrally; a level wheel supported on the framework behind the sweep mechanism and in advance of the traction wheel and engaging the surface of the material at a point behind the pivotal axis of the connection between the structure and framework whereby raising and lowering of the structure will effect raising and lowering of the sweep mechanism; and a centrally located mechanism supported on the framework effective to receive material from the sweep mechanism and discharge it through the material outlet.

15. A material unloader for use in a silo having an upright silo wall with a material outlet in one side thereof comprising: a rigid laterally disposed framework extending from a central portion in the silo to points adjacent the wall; drive means on the central portion of the framework; a traction wheel drive shaft having an inner end articulately connected to the drive means and extending to an outer end spaced from the central portion of the silo; a drive wheel on the outer end of the wheel drive shaft effective to move the framework angularly around the silo; a rigid laterally disposed structure pivotally mounted on the framework for up and down movement and extending toward the traction wheel; a journal on the structure engaging the shaft and effective to raise and lower the structure in accordance with the material level the traction wheel is passing over; a sweep mechanism mounted on the framework angularly spaced substantially at 90° of the drive wheel effective to move material centrally; a level wheel supported on the framework between the sweep mechanism and in advance of the traction wheel and engaging the surface of the material at a point offset from the pivotal axis of the connection between the structure and framework whereby vertical movement of the structure will effect vertical positioning of the sweep mechanism; and a centrally located mechanism supported on the framework effective to receive material from the sweep mechanism and discharge it through the material outlet.

16. A material unloader for use in a silo having an upright silo wall with a material outlet in one side thereof comprising: a rigid laterally disposed framework extending from a central portion in the silo to points adjacent the wall; a centrally located suspension element connected to the central portion of the framework and pendently supporting the framework from the top of the silo; drive means on the central portion of the framework; a traction wheel drive shaft having an inner end articulately connected to the drive means and extending to an outer end spaced from the central portion of the silo; a drive wheel on the outer end of the wheel drive shaft effective to move the framework angularly around the silo; a rigid laterally disposed structure pivotally mounted on the framework for up and down movement and extending toward the traction wheel; a journal on the structure engaging the shaft and effective to raise and lower the structure in accordance with the material level the traction wheel is passing over; a sweep mechanism mounted on the framework angularly spaced substantially at 90° of the drive wheel effective to move material centrally; a level wheel supported on the framework between the sweep mechanism and in advance of the traction wheel and engaging the surface of the material at a point offset from the pivotal axis of the connection between the structure and framework whereby vertical movement of the structure will effect vertical positioning of the sweep mechanism; and a centrally located mechanism supported on the framework effective to receive material from the sweep mechanism and discharge it through the material outlet.

17. A material unloader for use in a silo comprising: a main framework; a centrally located suspension element connected to and pendently supporting the framework from the top of the silo; central drive means supported on the framework; a traction wheel drive shaft having an inner end articulately connected to the drive means and extending to an outer end spaced from the central portion of the silo; a traction wheel on the outer end of the wheel drive shaft effective to move angularly around the silo; a sweep mechanism mounted on the framework in relatively close angular proximity to the drive wheel and effective to move material centrally; a rigid structure extending between and pivotally interconnecting the drive shaft and sweep mechanism to permit relative vertical movement; and a level wheel supported on the sweep mechanism between the sweep mechanism and traction wheel and engaging the surface of the material at a point offset from the pivotal connection between the structure and sweep mechanism whereby vertical displacement of the traction wheel will effect vertical displacement of the sweep mechanism.

18. A material unloader for use in a silo comprising: a main framework; a centrally located suspension element connected to and pendently supporting the framework from the top of the silo; central drive means supported on the framework; a traction wheel drive shaft having an inner end articulately connected to the drive means and extending to an outer end spaced from the central portion of the silo; a traction wheel on the outer end of the wheel drive shaft effective to move angularly around the silo; a sweep auger mounted on the framework in relatively close angular proximity to the drive wheel and effective to move material centrally; a rigid structure extending between and pivotally interconnecting the drive shaft and framework to permit relative vertical movement; and a level wheel supported on the framework between the sweep mechanism and traction wheel and engaging the surface of the material at a point offset from the pivotal connection between the structure and framework whereby vertical displacement of the traction wheel will effect vertical displacement of the sweep auger.

19. The invention defined in claim 18 in which the main framework has a laterally disposed portion substantially at right angles to the drive shaft, the pivotal connection is substantially at right angles to the drive shaft and is closely adjacent the sweep auger, and the level wheel is connected to the framework by means of an arm which extends in a trailing direction from the laterally disposed portion of the framework.

20. The invention defined in claim 18 further characterized by a wall wheel supported on the framework adjacent the outer end of the sweep and engageable with the wall for preventing engagement of the outer end of the sweep with the wall.

References Cited by the Examiner

UNITED STATES PATENTS

| | | | |
|---|---|---|---|
| 1,866,005 | 7/32 | Beatty | 198—213 |
| 2,465,145 | 3/49 | Brainerd | 198—213 |
| 2,988,238 | 6/61 | Bruecker | 214—17 |
| 3,017,043 | 1/62 | Buschbom | 214—17 |

HUGO O. SCHULZ, *Primary Examiner.*